May 13, 1958 W. E. BAUER 2,834,217
LIQUID LEVEL RESPONSIVE APPARATUS
Filed Jan. 16, 1953 2 Sheets-Sheet 1

*INVENTOR.*
WILLIAM E. BAUER
BY
ATTORNEY.

May 13, 1958
W. E. BAUER
2,834,217
LIQUID LEVEL RESPONSIVE APPARATUS
Filed Jan. 16, 1953
2 Sheets-Sheet 2
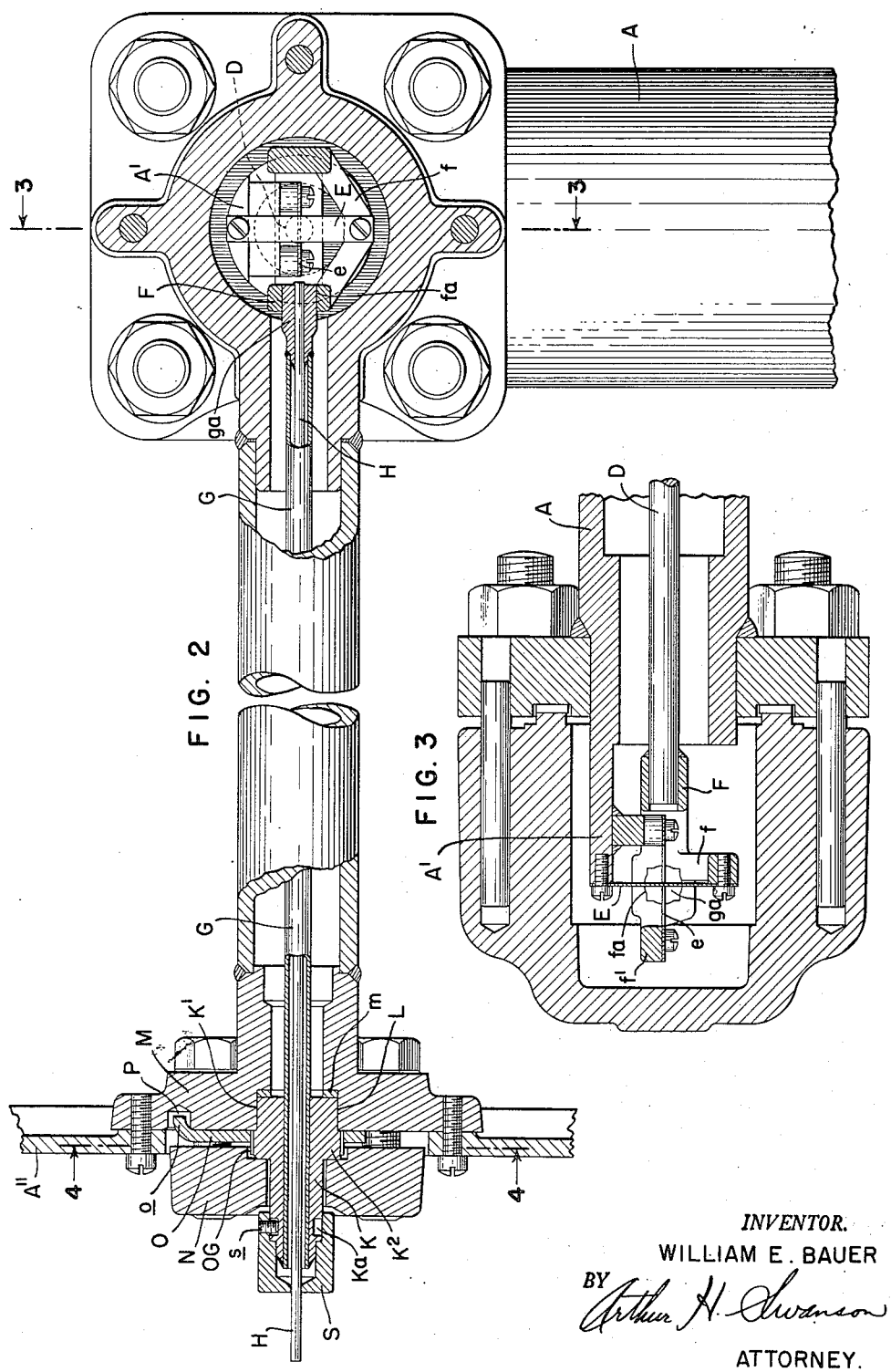
INVENTOR.
WILLIAM E. BAUER
BY
Arthur H. Swanson
ATTORNEY.

United States Patent Office 2,834,217
Patented May 13, 1958

2,834,217

LIQUID LEVEL RESPONSIVE APPARATUS

William E. Bauer, Palmyra, N. J., assignor to Minneapolis-Honeywell Regulator Company, Minneapolis, Minn., a corporation of Delaware Application January 16, 1953, Serial No. 331,626

7 Claims. (Cl. 74—18)

The present invention relates to liquid level responsive apparatus, and the general object of the invention is to provide an improved method and improved means for detecting variations in a liquid level in high pressure systems.

More specifically, the object of the present invention is to provide improved liquid level responsive apparatus of the known type disclosed in the Binckley Patent 1,966,537 of July 17, 1934, in which a closed horizontal torque tube has one end anchored in the wall of a housing enclosing a liquid chamber within the housing and has its other end subjected to a twisting or torque force created by, and varying with changes in liquid level within said chamber. The angular adjustment given to the inner tube of the torque tube rotates a shaft or rod which extends axially through the tube and has one end rigidly connected to the inner end of the torque tube and has its other end projecting away from the anchored end of the tube and operative to actuate exhibiting and/or control apparatus.

One primary object of the present invention is to provide simple and effective means for angularly adjusting the end of the torque tube anchored in the housing wall as required to accurately locate a zero or other predetermined position of the level responsive element.

A second primary object of the present invention is to provide a novel method of assembly alignment for liquid level responsive apparatus of the general type disclosed.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 2 is an elevation partly in section on a plane including the axis of a torque tube;

Fig. 3 is a section on the line 3—3 of Fig. 2; and

Figure 1:
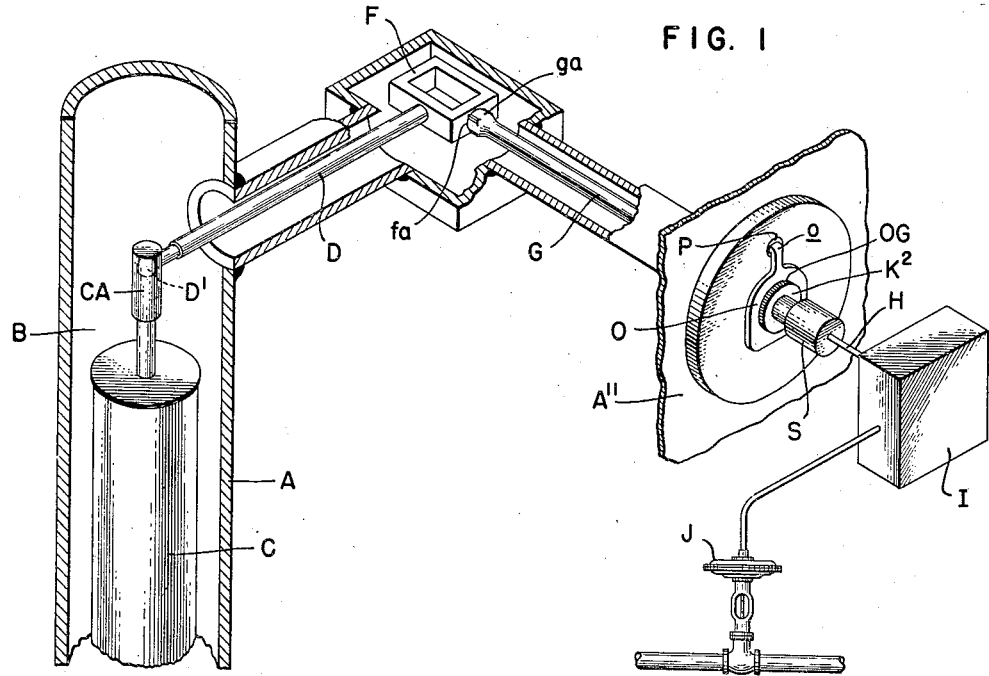
Fig. 1 is a perspective view diagrammatically illustrating an embodiment of the present invention.

In the drawings I have illustrated the use of a desirable form of the present invention in a liquid level detector in a high pressure liquid containing system. In Fig. 1 a housing wall A encloses a vertically elongated chamber B which is normally partially filled with liquid to a variable level. A liquid level responsive element C in the chamber B is a vertically elongated so-called displacer element. The element C comprises a hollow metallic cylinder with end walls and is weighted by lead shot within the cylinder.

As shown, the cylinder has an axial extension CA at its upper end which forms a bearing for a ball D' at one end of a horizontal arm D. The opposite end of the arm D is pivotally connected to the housing structure. As shown, the pivotal connection comprises cross-reeds or flexible metal strips E and e. As shown in Figs. 2 and 3, the strip E is vertically disposed and has its upper end connected to the housing structure A', and has its lower end connected to a depending portion f of an end member F attached to the adjacent end of the arm D. The strip e is horizontally disposed and has one end connected to the housing structure and has its other end connected to a horizontal portion f' of the member F. The line of intersection of the planes of strips E and e may be in line with the axis of the arm D.

The member F is formed with a squared or non-circular opening fa snugly receiving the closed end of a hollow torque tube G transverse to the arm D and advantageously in axial alignment with the axis of the pivot connection formed by the reeds E and e. The elongated body portion of the torque tube G is circular in cross section and extends through and is rigidly attached to the housing wall A". Axially disposed in the torque tube G is a rod H of small diameter which is welded to the plug ga through which the inner end of the torque tube G is connected to the member F, and by which the inner end of the torque tube bore is sealed. The outer end of the rod H is diagrammatically shown in Fig. 1 as extending into operative engagement with a control instrument I. The latter may take various forms and may serve various purposes. In the form shown, the instrument I is an air controller and operates through a valve J to regulate the supply of liquid to the chamber B as required to maintain a desired normal liquid level in that chamber.

For the purposes of the present invention, the outer end of the tube G is anchored in the wall A" by means including a splined bushing member K. The member K is coaxial with and fits snugly about the outer end portion of the torque tube G and is welded or otherwise rigidly attached to the latter. The member K comprises an inner end plug portion K' circular in cross section and snugly received in a socket L in a flange member M. The socket L is coaxial with the outer end portion of the tube G. The inner end of the member K bears against a sealing washer M interposed between the member K and an annular shoulder portion of the flange M extending inward from the periphery of the socket L. The member K is normally clamped against the flange M by a clamping member N, thus compressing the washer M and insuring a tight joint between the flange M and member K.

A circular portion $K^2$ of the member K at the outer end of the plug portion K', and shown as larger in diameter than the latter, is surrounded by a plate-like body, or hub portion, of an arm O which extends radially away from the axis of the member K. The arm O is operative to effect angular adjustments of the member K and thereby of the normally stationary end of the torque tube G. To effect such adjustments, the portion $K^2$ of the member K has its peripheral surface formed with a multiplicity of alternating ribs and grooves or splines parallel to the axis of said member and adapted to interlock with a corresponding plurality of grooves and ribs or splines formed in the inner wall of the hub portion of the arm O. The splined connection OG between the outer end of the torque tube G and the arm O is characterized by its capacity for use in easily effecting relatively minute and precise angular adjustments of the arm O with respect to the torque tube G. The outer end of the arm O is inturned to form a projection o which is normally received in a socket P provided for the purpose and extending into the flange M from the outer surface of that flange.

With its splined connection to the member K, the arm

Figure 4:
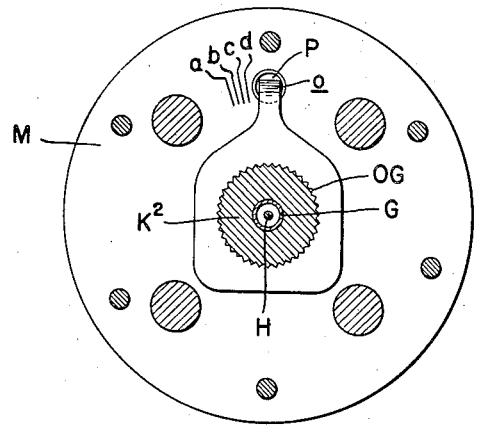
Fig. 4 is a section on the line 4—4 of Fig. 2.

O forms a novel and effective adjusting element for use in adjusting liquid level responsive apparatus of the general type disclosed herein, and is well adapted for use in carrying out my novel method of adjusting such apparatus. That method involves two steps, each of which may be carried out manually. The first of those steps involves the rotation of the normally anchored end of the torque tube G and member K in the required direction, clockwise as seen in Fig. 4, and to the extent required to take up lost motion between the torque tube G and displacer C. The second step of said method is the further rotation in the same direction of the normally anchored end of the torque tube G and member K, and through a pre-determined angle to thereby create a torque force which is impressed on the arm D and is sufficient to enable the latter to support the weight of the displacer in its zero position.

In carrying out said adjusting method by the use of the apparatus disclosed, the torque tube after being adjusted into its slack take up position, is maintained in that position while the member O is removed from and placed on the member K, if necessary to bring the projection o into register with an index mark a on the flange M. Thereafter, the second step of the process is carried out by further rotating the outer end of the torque tube G and arm O to bring the projection o into register with the socket P, and the member O is then moved toward the flange M as required to enter the projection o in the socket P.

To effect the last mentioned rotative adjustment of the tube G and member K, a manually actuated wrench may be applied to a member K. The member K may be formed with flattened sides to facilitate its engagement by a wrench.

The member S is formed with a circular hole serving as a bearing surface for the rod H. As shown, a set screw s is provided to prevent accidental longitudinal movement of the member S from the member K.

The described adjustment procedure is well adapted for an adequately accurate adjustment of the displacer C into its zero position without visual determination by the operator of the position of the body C. Such adjusting capacity is of especial importance in level detector apparatus where it is desirable to dispense with visual inspection of the displacer body during the adjusting operation.

In such apparatus the displacer member C may well have a diameter of the order of 2 inches and a length of the order of 14 inches. The overall length of the arm D may be of the order of 8 inches, and the overall length of the torque tube may be of the order of 14 inches or so. For high pressure operation, the wall of the detector apparatus may well comprise tubular pipe sections relatively small in diameter, including a vertical cage portion with an internal diameter which may be an inch or so greater than the outside diameter of the member C, a horizontal portion surrounding the arm D having an average internal diameter of an inch or so, and a section surrounding the torque tube having an internal diameter slightly less than an inch. The maximum vertical displacement of the element C may be of the order of one-half inch, which may be only a few percent of the variation in the level of the liquid in contact with the displacer C. The foregoing dimensions have not been stated because they are critical from the operative standpoint, but are significant because they illustrate the need for simple and effective adjusting provisions of the character disclosed.

For operation with a predetermined displacer element and torque tube, the index mark a and the socket P may well define the torque tube angular adjustment necessary to adjust the apparatus to its zero position. To accommodate different weights of displacer elements or different torque tubes, it may be desirable to provide for angular torque tube movements of different extents, and in such case the index mark a may be supplemented or replaced by one or more index marks, such as the marks b, c and d, shown in Fig. 4.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In apparatus for measuring variations in the level of liquid in a container, comprising a vertically movable displacer, a horizontal arm having one end pivoted to turn about a horizontal axis transverse to the length of the arm, a suspension connection through which said displacer is suspended from the second end of said arm, a torque tube transverse to said arm and having one end connected to the first mentioned end of said arm, and a stationary member, the improved means for adjustably anchoring the second end of said torque tube to said stationary member comprising an element angularly adjustable relative to the second end of said torque tube about the axis of the latter, means for detachably securing said element to said member in a predetermined position, and means including a splined connection between said element and torque tube for detachably securing said element to said second end in different angular positions relative to said second torque tube end.

2. An improvement as specified in claim 1, in which said member is formed with a socket and said element is formed with a projection adapted to enter said socket and thereby secure said element and second torque tube end to said member with said second end in an angular position dependent on the splined connection between said elements and torque tube.

3. An improvement as specified in claim 1, in which said element comprises a hub-like portion surrounding and rotatable about the axis of said second torque tube end, and in which said spline connection comprises a circular series of ribs and a circular series of grooves adapted to receive said ribs, one of said series being in fixed position relative to said second torque tube end and the other series being in fixed position relative to said element.

4. Means for adjustably anchoring the stationary end of a torque tube including, a stationary member, an element angularly adjustable relative to said stationary member about the axis of the torque tube, an arm projecting from said element at an angle to the axis of the torque tube and adapted to be grasped by hand and to provide means for turning said stationary end of said torque tube by hand to a pretermined position, means for detachably securing said element to said member in said predetermined position, and means including a splined connection between said element and the torque tube for detachably securing said element to said stationary end of the torque tube in different angular positions relative thereto.

5. An improvement as specified in claim 4 in which said member is formed with a socket and said element is formed with a projection adapted to enter said socket and thereby to secure said element and said stationary end of the torque tube to said member with said stationary end in an angular position dependent on the splined connection between said element and the torque tube.

6. Means for adjustably anchoring the stationary end of a torque tube including, a stationary member having a circular hole through it, a bushing element secured to the stationary end of the torque tube and having a first surface of circular cross section snugly received in said hole and having a second surface of circular cross section larger in circumference than said first surface and having splines thereon parallel to the axis of the torque tube, an arm having a circular hole through it forming a hub portion, said hole being formed on its inner surface with splines interfitting with the splines on said bushing element, said arm extending radially away from the axis of the torque tube, and means for detachably securing said arm to said stationary member in a predetermined position.

7. In measuring apparatus employing a torque tube as a resilient, motion-transmitting seal; the combination including: a resilient, hollow, cylindrical tube; a rod extending through said tube and fastened to one end thereof; said one end being arranged for connection to a means for transmitting motion; and an adjustable fastening means for the other end of said tube, said fastening means comprising: a stationary member having a socket in it; a bushing element secured to the other end of said tube and having splines on a surface thereof; an arm having a circular hole through it formed on its inner surface with splines interfitting with the splines on said bushing element, said arm extending radially away from the axis of said tube and having its end bent at an angle to the radially extending portion of said arm so as to enter said socket and thereby lock said arm in a preselected position.

References Cited in the file of this patent

UNITED STATES PATENTS

| | | |
|---|---|---|
| 1,827,560 | Binckley | Oct. 13, 1931 |
| 1,966,537 | Binckley | July 17, 1934 |
| 2,248,322 | Annin | July 8, 1941 |
| 2,542,769 | Griffey | Feb. 20, 1950 |

FOREIGN PATENTS

| | | |
|---|---|---|
| 424,452 | Great Britain | Feb. 21, 1935 |
| 469,134 | Great Britain | July 20, 1937 |
| 844,796 | France | May 1, 1939 |